(12) United States Patent
DePue et al.

(10) Patent No.: US 7,788,234 B2
(45) Date of Patent: Aug. 31, 2010

(54) STAGED, LIGHTWEIGHT BACKUP SYSTEM

(75) Inventors: Adam DePue, Redmond, WA (US); Paul Fitzgerald, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 333 days.

(21) Appl. No.: 11/844,351

(22) Filed: Aug. 23, 2007

(65) Prior Publication Data

US 2009/0055446 A1    Feb. 26, 2009

(51) Int. Cl.
*G06F 7/00* (2006.01)
*G06F 17/00* (2006.01)

(52) U.S. Cl. .................................. 707/681; 707/686
(58) Field of Classification Search .................. None
See application file for complete search history.

(56) References Cited

U.S. PATENT DOCUMENTS

| | | | |
|---|---|---|---|
| 6,892,221 B2 | 5/2005 | Ricart et al. | |
| 6,981,177 B2 | 12/2005 | Beattie | |
| 7,039,830 B2 | 5/2006 | Qin | |
| 7,085,904 B2 | 8/2006 | Mizuno et al. | |
| 7,165,154 B2 | 1/2007 | Coombs et al. | |
| 7,194,652 B2 * | 3/2007 | Zhou et al. ..................... | 714/4 |
| 2005/0039069 A1 | 2/2005 | Prahlad et al. | |
| 2005/0246398 A1 | 11/2005 | Barzilai et al. | |
| 2006/0173935 A1 | 8/2006 | Merchant et al. | |
| 2006/0179083 A1 | 8/2006 | Kulkarni et al. | |
| 2007/0136541 A1 | 6/2007 | Herz et al. | |
| 2007/0168401 A1 * | 7/2007 | Kapoor et al. ............... | 707/202 |
| 2008/0109495 A1 * | 5/2008 | Herberger et al. ........... | 707/204 |

OTHER PUBLICATIONS

"Improving Backup and Recovery Strategies", A Technical White Paper, Sep. 2003, Sun Microsystems, Inc., 2003, pp. 30.
"Converging System and Data Protection", White Paper: Data System and Recovery, Symantec Corporation, 2006, pp. 15.
Robichaux, "Availability Building Blocks: Disaster Recovery", Realtime Publishers, pp. 23-41.

* cited by examiner

*Primary Examiner*—Uyen T. Le
(74) *Attorney, Agent, or Firm*—Russell S. Krajec; Krajec Patent Offices, LLC

(57) ABSTRACT

A restore system may perform a two staged restore operation. The first operation may restore system state and basic operational data to a system sufficient that the system may begin performing a set of basic operations. The second operation may restore secondary data over a period of time while the system is at least partially operational. The system state and basic operational data may be identified and backed up in a separate operation than the secondary data, or may be extracted from a backup volume of the system. The system state restore may be performed by installing a base set of data or applications and injecting specific system state information.

20 Claims, 4 Drawing Sheets

STAGED, LIGHTWEIGHT BACKUP SYSTEM

BACKGROUND

Backup and restore systems are commonly deployed on many computer systems and other devices that contain data. Such backup and restore systems may copy data from one source, such as a hard disk or other data storage system, to another source, such as an offsite data repository, removable tape or optical storage system, or other device.

In a restore operation, a new set of data storage media may be created or the original media overwritten to create a data source that is capable of operating as the original media. A hardware failure may cause the replacement of data storage hardware, which may have the data recreated from a backup data location. In another case, a corruption, misconfiguration, or other damage to stored data may be cause for data to be overwritten with a known good version of data from a previous backup.

With the large size of storage media available, backup and restore operations may be very time consuming. During backup operations, a working copy of a data set may be used to create a backup while other operations continue. Such a system may consume some processor bandwidth, but may keep the system in an operable state. However, during a restore operation, a large amount of data may be transferred consuming a large amount of time, during which a system may not be operable until the restore operation is complete.

SUMMARY

A restore system may perform a two staged restore operation. The first operation may restore system state and basic operational data to a system sufficient that the system may begin performing a set of basic operations. The second operation may restore secondary data over a period of time while the system is at least partially operational. The system state and basic operational data may be identified and backed up in a separate operation than the secondary data, or may be extracted from a backup volume of the system. The system state restore may be performed by installing a base set of data or applications and applying specific system state information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
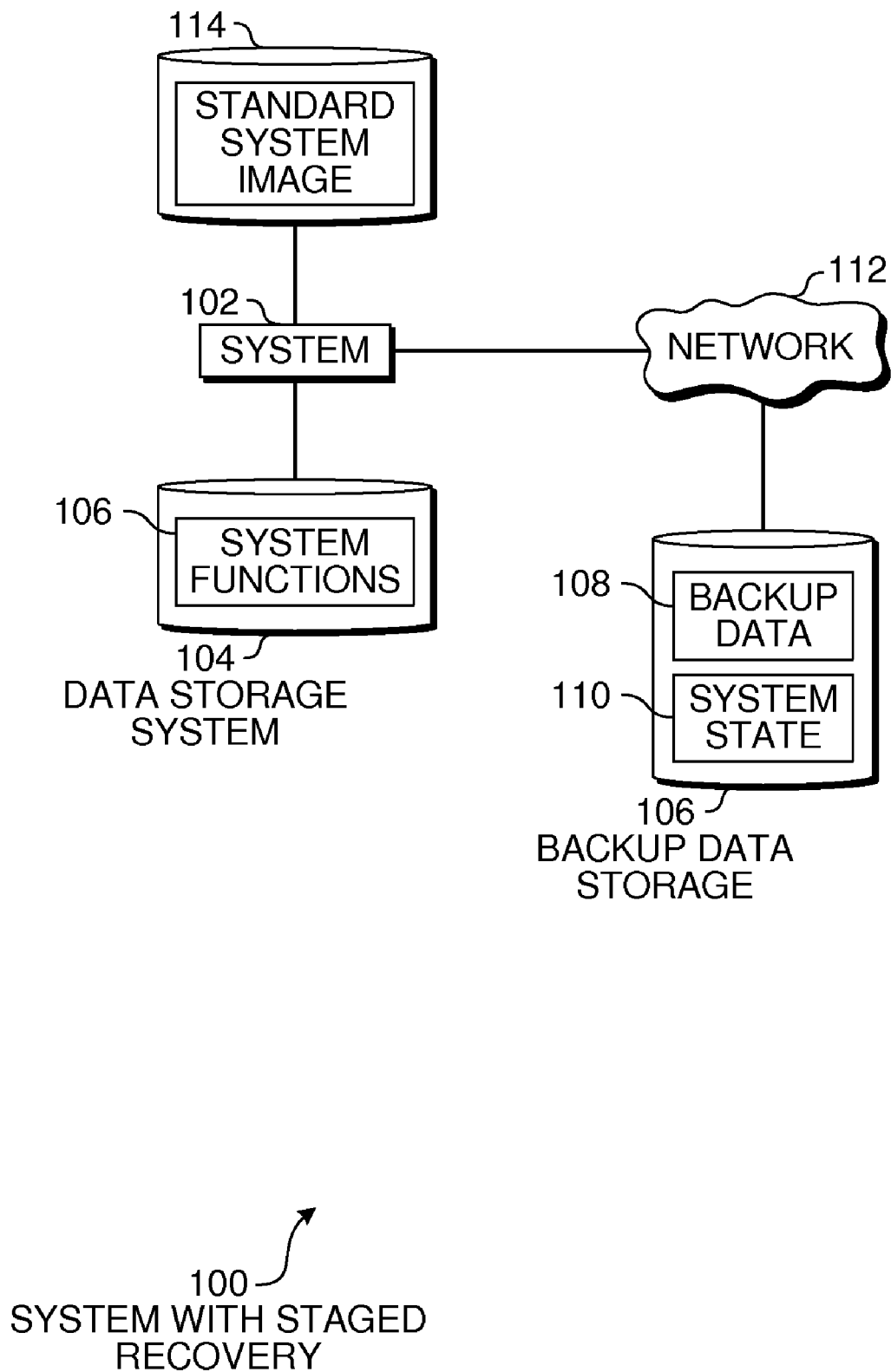
FIG. 1 is a diagram illustration of an embodiment showing a system that may be used for staged restore.

A backup and restore system may use a system state to quickly configure and start certain functions before restoring other data. The system may allow certain functions, such as server related network functions or other identified functions, to be up and running quickly, even when a full system restore may take many minutes or even hours.

The system state may be a small subset of state variables that may be injected into a basic configuration of a system to cause the system to begin to perform certain functions. While the functions are performing, the remaining backup data may be restored. Other embodiments may use different techniques for saving and using system state definitions.

The system may be used to recover from a hardware failure, such as the failure of a disk drive or other storage device. In some cases, the system may be used to migrate a system from an older hardware platform to a new hardware platform. In still other cases, the system may be used to revert to a previously saved or backed up configuration.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system that may be backed up and restored in two stages. In a first stage, various system functions may be installed and configured to operate, then the remaining data may be restored while the system functions are operating.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

The system 102 may be a computer, such as a server computer, that may perform certain services or functions. When the system 102 is restored from a backup, some functions may be started operating before other data are restored. The system 102 may be any type of device with a data storage system 104 that may have some system functions 106 that are to be restored prior to other data on the data storage system 104. Examples of such devices may be personal computers, server computers, personal digital assistants, network appliances, game consoles, entertainment systems, wireless communication devices, industrial controllers, network routers, or any other device that contains a data storage system.

Data backup and restore systems are used in many situations where the system 102 or data in its data storage system 104 have high value functions. In the case of a server system, the server may perform various network management or data management functions across a network for many client devices. In some cases, a server may host various applications that are used by clients across a network, such as an accounting system or email system that may be shared by several users. When such high value systems or data are disrupted, the devices and users that depend on the system or data may be unable to perform their assigned tasks.

The system 102 may use the data storage system 104 to store various code that is executed by the system 102. Such code may include operating system level code and application level code. In many cases, operating system level code may perform various low level functions, including network connectivity, low level device interfaces, and various services that may be used by the system 102 and other devices attached to a network 112. Application level code may operate within an operating system environment and provide many different functions, from accounting systems and email systems to games, web hosting, or any type of function.

Various backup methodologies and architectures may be deployed to make a copy of all or a portion of the data storage system 104 onto a backup data storage system 106. A backup system may store data in any useful format so that the data storage system 104 may be recreated. In some cases, a backup system may attempt to recreate the data storage system 104 on a bit-by-bit level by backing up and recreating an image of the data storage system 104. In other cases, a backup system may make copies of individual files found in the data storage system 104, and individual files may be restored to the data storage system 104 during a restore operation.

Some backup systems may give a user or administrator the ability to restore portions of a file system. For example, a user may be able to select individual files to restore. Such systems are useful in cases where a user unintentionally or inadvertently deletes or changes a file and wishes to revert back to a previously backed up version.

The system 102 may be backed up on a regular basis. In many environments, a backup system may be configured to perform a backup operation on a recurring basis, such as every night or on weekends when the system usage may be low. In some cases, the backup system may transfer backup data over a network 112 to a backup data storage 106 that may be located on a different device on a local area network or accessed via the Internet to an offsite device.

When the data storage system 104 is restored, the time to perform a full restore operation may be quite lengthy. In many cases, even with high speed network connections, a standard personal computer may take one or more hours to restore. Server computers with large amounts of data may take several hours to restore, especially when the restore operation is performed from a remote backup data storage system.

Restore operations are often responses to catastrophic failures of hardware, such as the crashing or corruption of a disk drive, failure of a motherboard, damage due to a voltage spike, or some other failure. In such cases, a failed hardware component may cause an individual component or the entire system to be replaced.

Restore operations may also be performed after a virus, worm, or other malicious software infiltrates a file system, after an update or installation of an application or operating system is aborted, a user mistakenly or maliciously deletes sensitive data, or for some other situation where a decision is made to revert to a previous version of the data on the data storage system 104.

In some cases, a restore operation may be used to migrate an operating system, applications, and functions from one hardware platform to another hardware platform. An example may be when a server computer is upgraded by replacing the entire server hardware with a new server hardware that may include a new data storage system 104.

The restore operation may be performed in two stages. In a first stage, a set of identified system functions 106 may be installed and configured with system state data 110. The system functions 106 may be started operating in the first phase while, in the second phase, remaining data may be restored to the data storage system 104. In many cases, the first stage of installing and configuring the system functions 106 may be performed in a matter of minutes while the second stage of copying large amounts of other data may be performed in a matter of several hours.

By identifying, installing, and operating several system functions 106 prior to performing the bulk of a restore operation, the system functions 106 may be used by other devices and users even though the system restore may not be complete.

For example, the system 102 may be a server computer and may perform several network related functions, such as Domain Name Sever (DNS) or Dynamic Host Configuration Protocol (DHCP) services. Such functions may be part of an operating system or application function that enables other devices or users to connect to a network. In such an example, if the server 102 were down for several hours performing a restore operation without enabling the DNS or DHCP services, many users may be prevented from performing other tasks.

Other examples of such functions include various network functions, email application functions, domain name service functions, dynamic host configuration protocol functions, remote access functions, virtual private network functions, web hosting functions, and firewall functions.

In order to install and enable the system functions 106 to be operational during the second stage of a restore operation, a set of system state data 110 may be used to configure the system functions 106 during a first stage of the restore operation. During the first stage of a restore operation, a standard system image 114 or some other generic set of operating system or application files and data may be installed on the data storage system 104. The system state data 110 may be injected or used to configure the various system functions 106 so that the functions operate in the same manner as when the backup operation was performed.

For example, a system function 106 may include connecting to a network with a specific host name and operating a DNS function. During the first stage of a restore operation, a standard system image 114 of a server operating system may be written onto the data storage system 104 and the system state data 110 may be used to configure the system network connection with the same host name and operate the DNS service with the same parameters as when the system 102 was backed up. The standard system image 114 may be obtained from an installation disk or other source than the backup data storage system 106. In some cases, the standard system image 114 may be an actual disk image that is used to create a starting image for the restore process while in other cases, the standard system image 114 may be a collection of generic files that may be supplied using a set of installation disks.

The system state data 110 may be separately stored during a backup operation. In some cases, the system state data 110 may be determined by analyzing the backup data 108.

During the first stage of the backup, the system state 110 may be copied to a disk or other media so that the system 102 may be configured before the second stage of restore is performed. In many cases, the system state data 110 may be very small in comparison to the backup data 108.

Figure 2:
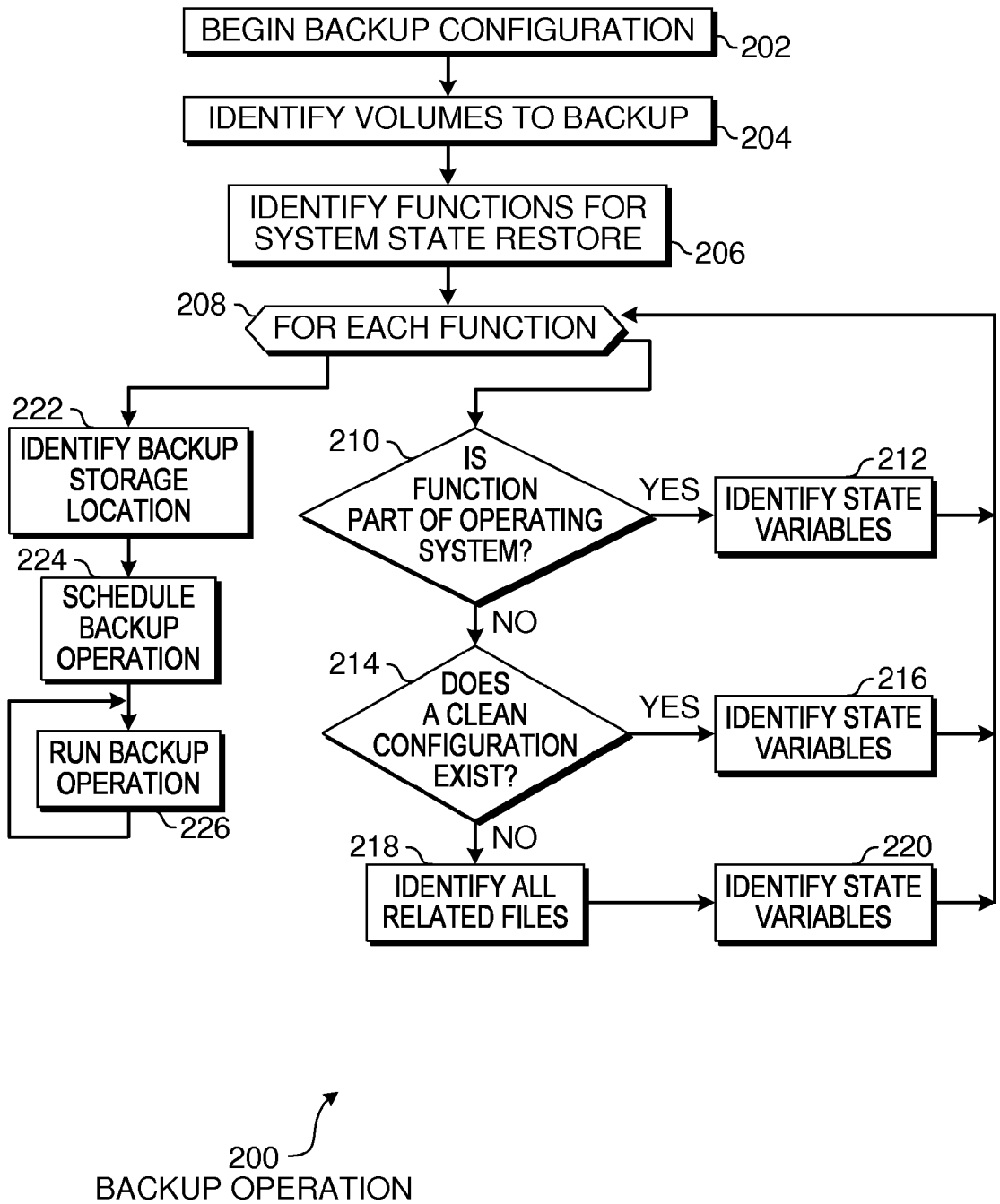
FIG. 2 is a flowchart illustration of an embodiment showing a backup operation.

FIG. 2 is a flowchart illustration of an embodiment 200 showing a method for a backup operation. Embodiment 200 illustrates a backup operation that identifies certain system state functions that are to be configured and operated during a first stage of a backup operation. Each function may be an operating system level function or may be a separate application or other function. For each function, data are identified that may be used during a restore operation to configure and launch the function prior to restoring other data.

Embodiment 200 creates a backup operation that may be performed many times. The backup operation is begun in block 202 and volumes to back up are identified in block 204. The volumes may be any logical data storage device. In some cases, a volume may be made up of multiple physical data storage devices, such as a Redundant Array of Independent Disks (RAID) configuration. In some cases, a single device such as a hard disk may contain two or more volumes. In some instances, a volume may be contained within a volatile or non-volatile memory system such as a flash memory or other device capable of storing data.

Functions for system state restore are identified in block 206. The functions identified in block 206 may be any type of function, including operating system functions and application functions. In some cases, the functions for system state restore may be portions of an operating system while in other cases, the functions may be contained in applications that are installed and operated within an operating system environment.

For each function in block 208, if the function is part of the operating system in block 210, the state variables for the function are identified in block 212. The identified variables of block 212 may be configuration files, registry entries, or other variables or definitions that may be used during a restore operation to configure the function for operation.

If the function is not part of the operating system in block 210 but there is a clean configuration of the function or application containing the function in block 214, the state variables are identified in block 216. The clean configuration of block 214 may include a set of installation files, portion of a disk image, or other set of function definitions that may or may not include the state variables of block 216. A clean configuration may include a set of installation disks available on media that may be used during a restore operation.

If a clean configuration does not exist in block 214, all files related to the function may be identified in block 218 and the state variables may be identified in block 220. When a clean configuration does not exist for an application in block 214, the files relating to the function may be identified for separate backup in block 218. Such files may be used to recreate the function during a restore operation so that the function may operate during a second restore stage.

For each function in block 208, data are identified that may be used to recreate and restart the function. During a restore operation, the operating system may be installed and initially configured to perform a designated function as well as some functions defined by various applications. In some cases, the operating system and applications may be installed from an installation disk or other medium that may be separate from the backup data storage medium. After installing the operating system and applications, the state variables may be used to configure and launch the various functions.

In cases where an installation disk or other generic version of an application or function does not exist, a backup system may identify the various files that make up the function so that the function may be restored and operational during a first restore stage.

In some embodiments, a backup system may create a separate volume or backup storage area in which to store the state variables and any files relating to the functions to be installed and started in the first stage of restore. In such cases, the separate backup storage area may be able to be copied to a portable disk or other media for use during the restore process.

The backup storage location may be identified in block 222. In some embodiments, the backup storage location may be a backup storage device attached to the system to be backed up. An example may be a tape backup system, writable optical storage system, or backup hard disk system. In some such examples, the backup storage location may have removable media so that the media may be stored in a secure location such as a vault or safe deposit box.

In another embodiment, the backup storage location may be a backup storage device that is accessed over a network, include a local area network or the Internet. In some such embodiments, a backup storage device may be used to store backup data from many different systems.

Some embodiments may use data compression and/or data encryption for the data that are stored in a backup storage system.

Once the backup operation is defined, the backup operation may be scheduled in block 224 and run in block 226. In many embodiments, a backup operation may be scheduled to be performed during periods of low usage, such as at night or during weekends.

Some backup systems may be configured to perform full backups in some instances and incremental backups at other times. Incremental backups may be used to store the data that has changed since the last backup was performed. In some many cases, a full backup may produce a large set of backup data, but the incremental backups may produce only a small fraction of such data and may be performed more rapidly and take up less space than performing a full backup.

Any backup technology may be employed to perform the actual backup operation.

Figure 3:
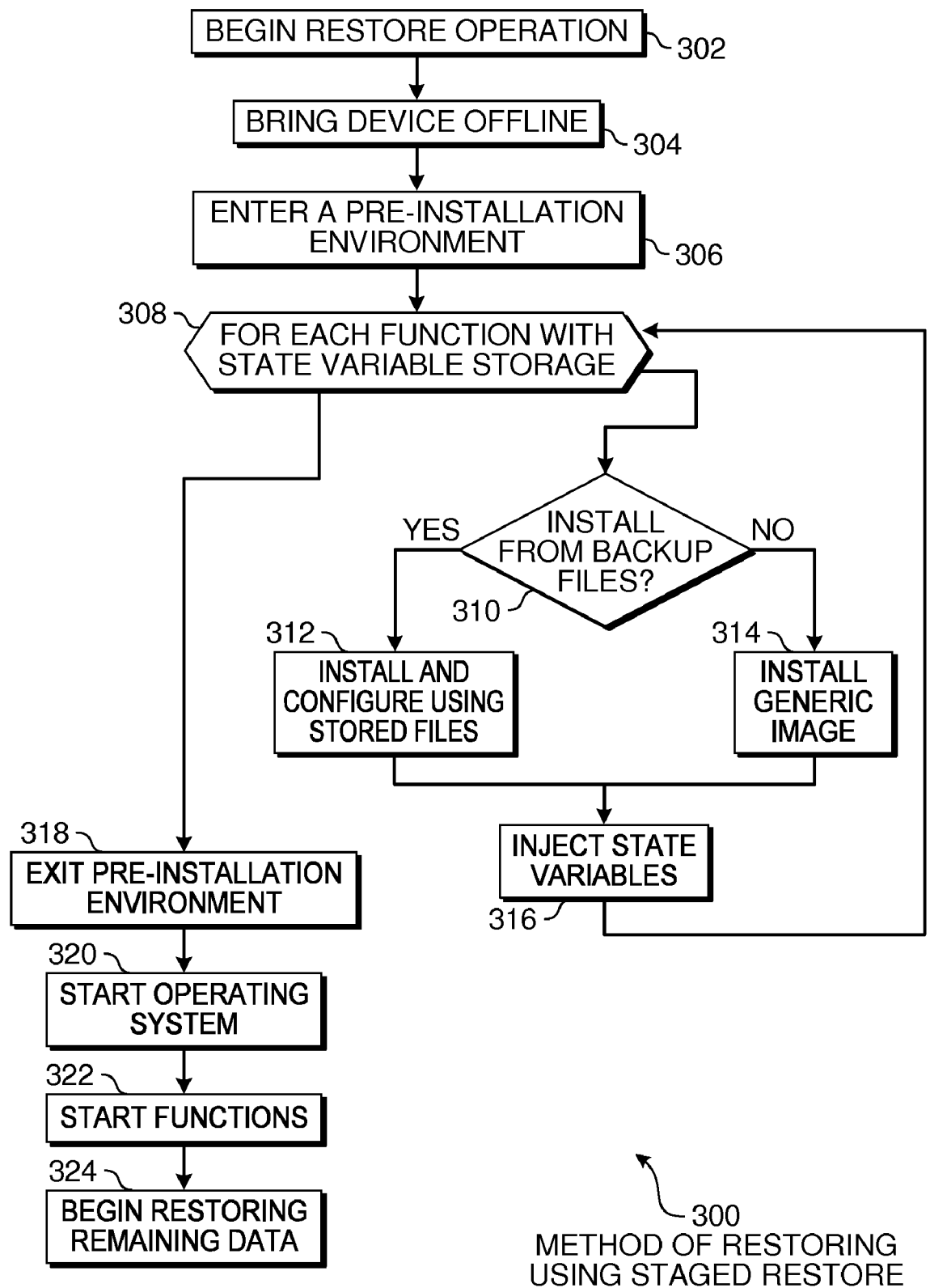
FIG. 3 is a flowchart illustration of an embodiment showing a staged restore operation with predetermined functions.

FIG. 3 is a flowchart illustration of an embodiment 300 showing a method for restoring using a staged restore operation. Embodiment 300 is one method by which a set of pre-defined functions are installed, configured, and started before a bulk of the restore operation may be performed.

Embodiment 300 is for those cases where functions are defined ahead of time and may have state variables or files separately stored during a previous backup operation. Embodiment 400, described later in this specification, illustrates an embodiment where these functions are defined after the backup operation has been performed.

The restore operation is begun in block 302.

The device being restored is brought offline in block 304 and enters a pre-installation environment in block 306. Some systems may have a pre-installation environment that may enable rapid installation and configuration of operating system functions and applications to the system. In some cases, the pre-installation environment of block 306 may be started by booting a system using a restore disk or an operating system installation disk.

During a full restore operation, a system may have a new or clean version of an operating system installed and configured. In some embodiments, a partition within a hard disk or other data storage area may contain an image of an operable operating system. Such an image may be written onto the system being restored so that the system may at least become partially operational.

For each function with state variable storage in block 308, the function will be installed and configured. If the function is to be installed from backed up files for the function or application in block 310, the function is installed and configured using stored files in block 312. A full copy of the function may be installed if the function is not included in a base version of the operating system or other image used to operate the device during the initial portion of the restore operation.

If the function is not contained in backup files but defined in installation disks, default system image, or some other installation medium in block 310, the generic image is installed in block 314.

State variables are injected into the installation in block 316. The method of injecting state variables may include overwriting configuration files, making registry entries, or other configuration actions.

After the functions are installed and configured, the pre-installation environment may be exited in block 318 and the operating system started in block 320. Each of the functions may be started in block 322 and the remaining backed up data may be restored in block 324.

Each embodiment may use different techniques and sequences for loading and configuring functions that may be operational during a second stage of restoring. Some embodiments may or may not use a pre-installation environment as in blocks 306 and 318 for performing the installation and configuration of the various functions. Such embodiments may use a first operating system to load and configure a data storage system which may be a bootable data storage system with a second operating system. Other embodiments may install and load a single operating system that may be configured to perform the various functions.

The restoring of remaining data in block 324 may include restoring applications, functions, as well as raw data that may be stored or operate on the device. The applications or functions that are restored and configured during block 324 may be those functions that are selected to be operable after a set of higher priority applications or functions that may be started in block 322.

The functions that are started in block 322 may be those functions that can be quickly and efficiently installed and configured. Such functions may be operating during the period where other backup data, including additional functions and applications, may be restored.

Figure 4:
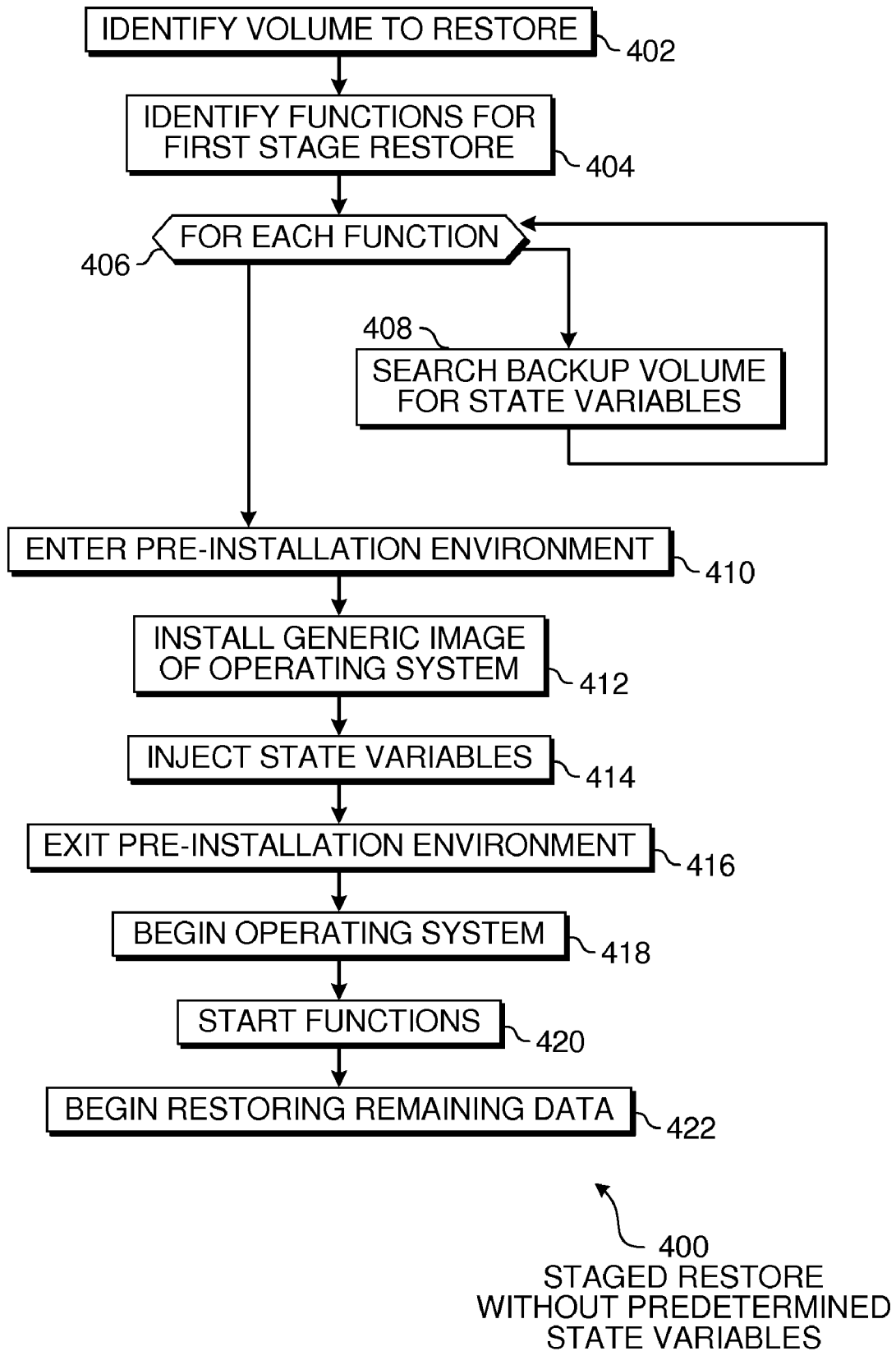
FIG. 4 is a flowchart illustration of an embodiment showing a staged restore operation without predetermined functions.

FIG. 4 is a flowchart illustration of an embodiment 400 showing a method for a staged restore without predetermined state variables. Embodiment 400 is a method whereby certain functions may be identified for the first stage of a restore operation, and the state variables for those functions are derived from an analysis of a backup data set. Once the state variables are discovered, the functions are loaded, configured, and started before other remaining data are restored.

A volume to restore is identified in block 402. In many backup and restore systems, a backup operation may create several volumes of backup data.

Functions for first stage restore are identified in block 404. In some embodiments, the functions may be selected from a list of possible choices.

For each of the functions in block 406, the backup volume may be searched for state variable information in block 408. The state variables for the various functions may be located in many different locations, including configuration files, registry settings, or other locations.

A pre-installation environment may be entered in block 410. A generic image of an operating system may be installed in block 412 and the state variables may be injected in block 414 to configure the various functions. When the pre-installation environment is exited in block 416, the operating system may be started in block 418 and the functions begun in block 420. The remaining data may be restored in block 422.

The operations of block 402 through 408 may be performed using an application on a device other than the device for which a restore operation is planned. For example, a first server device is scheduled for the restore operation, and a second server may host the data storage device on which the backup data for the first server is stored. An application running on the second server may be used to identify functions for first stage restore and search the backup volume to extract the state variables. Such an application may also create an initial install disk or image that may be loaded onto the first server. The first server may then be booted using the install disk or image, begin the function operations, and restore the remaining data.

Each embodiment may use different sequences and various processes for installing, configuring, and executing various functions prior to performing a second stage of restoring.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
   identifying a data storage system to backup;
   identifying a plurality of functions, each of said plurality of functions having a system state;
   backing up said data storage system by a method comprising writing backup data to a data storage device;
   performing a restore of said data storage system by a method comprising:
      configuring a base configuration of said data storage system;
      injecting a system state onto said base configuration;
      operating said data storage system using said system state;
      while said system is operating using said system state, restoring said backup data to said system.

2. The method of claim 1, said system state being determined prior to creating said backup data.

3. The method of claim 1, said system state being stored separately from said backup data.

4. The method of claim 3, said system state being derived from said backup data.

5. The method of claim 3, said identifying a plurality of functions being performed after said backing up.

6. The method of claim 1, said system state being determined after creating said backup data.

7. The method of claim 1, said plurality of functions comprising at least one of a group composed of:
   network functions;
   email application functions;
   domain name service functions;
   dynamic host configuration protocol functions;
   remote access functions;
   virtual private network functions;
   web hosting functions; and
   firewall functions.

8. A computer readable storage medium comprising computer executable instructions adapted to perform the method of claim 1.

9. A system comprising:
   a data storage system;
   a backup system configured to identify data to backup and backup said data to a backup storage system; and
   a restore system configured to:
      identify a plurality of functions, each of said plurality of functions having a system state;
      configure a base configuration of said system on said data storage system;
      inject said system state onto said base configuration;
      operate said system from said data storage system using said system state;
      while said system is operating using said system state, restore said backup data to said system on said data storage system.

10. The system of claim 9, said system state being determined prior to creating said backup data.

11. The system of claim 9, said system state being stored separately from said backup data.

12. The system of claim 9, said system state being determined after creating said backup data.

13. The system of claim 12, said system state being derived from said backup data.

14. The system of claim 12, said identifying a plurality of functions being performed after said backup said data to a backup storage system.

15. The system of claim 9, said plurality of functions comprising at least one of a group composed of:
   network functions;
   email application functions;
   domain name service functions;
   dynamic host configuration protocol functions;
   remote access functions;
   virtual private network functions;
   web hosting functions; and
   firewall functions.

16. A method comprising:
   identifying a set of functions operable on a system;
   storing a system state for said set of functions;
   storing backup data for said system;
   restoring said system by a method comprising:
      restoring said set of functions to said system;
      configuring said set of functions using said system state;
      beginning operation of said set of functions;
      while said set of functions are operating, restoring said backup data to said system.

17. The method of claim 16, said set of functions comprising at least one of a group composed of:
   network functions;
   email application functions;
   domain name service functions;
   dynamic host configuration protocol functions;
   remote access functions;
   virtual private network functions;
   web hosting functions; and
   firewall functions.

18. The method of claim 16, said system state and said backup data being stored on a common data storage system.

19. The method of claim 16, said system state comprising security state identifiers.

20. A computer readable storage medium comprising computer executable instructions adapted to perform the method of claim 16.

* * * * *